United States Patent [19]

Inaba et al.

[11] 3,896,361

[45] July 22, 1975

[54] METHOD AND APPARATUS FOR COMPENSATING AN ERROR IN NUMERICAL CONTROL

[75] Inventors: Seiuemon Inaba; Kanryo Shimizu, both of Kawasaki; Yoshihiro Hashimoto, Yokohama; Youichi Amemiya, Tokyo; Hiroshi Usami, Kawasaki, all of Japan

[73] Assignee: Fujitsu Limited, Japan

[22] Filed: Oct. 12, 1970

[21] Appl. No.: 80,041

[30] Foreign Application Priority Data
Oct. 24, 1969 Japan.............................. 44-85138

[52] U.S. Cl. ............... 318/616; 318/618; 318/632; 318/685
[51] Int. Cl. ..................... G05b 5/01; G05d 23/275
[58] Field of Search .......... 318/573, 574, 616, 618, 318/632, 685

[56] References Cited
UNITED STATES PATENTS

| | | | |
|---|---|---|---|
| 3,416,056 | 12/1968 | Motooka et al. ................... | 318/573 |
| 3,422,325 | 1/1969 | Gerber et al...................... | 318/574 |
| 3,539,897 | 11/1970 | Sommeria...................... | 318/616 X |

*Primary Examiner*—T. E. Lynch
*Attorney, Agent, or Firm*—Robert E. Burns; Emmanuel J. Lobato; Bruce L. Adams

[57] ABSTRACT

A method and apparatus providing compensation for an error or deviation occuring in numerical control apparatus having a servo-control system, wherein a command signal quantity and a compensating signal quantity are applied simultaneously to a pulse motor connected to drive a movable machine element. The compensating signal quantity is obtained from a summing device which combines the command signal quantity, a signal generated in proportion to the actual velocity of the movable machine element, and a deviation signal generated in proportion to the command signal quantity. The deviation signal is provided by a deviation setting circuit so as to vary linearly in relation to a command velocity determined by the command signal quantity during the time the command is issued so that continuous path control of the movable element can be carried out accurately.

2 Claims, 7 Drawing Figures

METHOD AND APPARATUS FOR COMPENSATING AN ERROR IN NUMERICAL CONTROL

BRIEF SUMMARY OF THE INVENTION

This invention relates to a method and an apparatus for compensating an error in numerical control.

In a numerically controlled machine provided with a numerical control device, there has been proposed a method in which the difference between the driving quantity for the machine by its feed mechanism and the actual moving quantity of the machine is detected, and then a compensating signal to compensate the difference is generated and supplied superposing the command signal by way of electric circuits or differential mechanisms. As a result of this, a fairly steady and accurate servo system has been obtained.

So, the principal object of the present invention is to provide a more improved method and apparatus for compensating an error in numerical control.

The details of the invention will now be apparent with reference to the accompanying drawings in which:

FIG. 1 is a block diagram of a numerical control system provided with an already proposed error-compensating apparatus, FIG. 2 is a block diagram of a numerical control system applying an error-compensating method and apparatus in accordance with the present invention, FIG. 3 is an explanatory diagram showing an embodiment of a deviation setting circuit, FIG. 4 is a detailed explanatory diagram of a compensating pulse generating portion, FIG. 5 is a block diagram of another embodiment of a numerical control system applying an error-compensating method and apparatus in accordance with the present invention, FIG. 6 is a diagram showing another embodiment of a deviation setting circuit, FIG. 7 is a diagram of an improved compensating pulse generating portion shown in FIG. 4.

DETAILED DESCRIPTION OF THE INVENTION

Figure 1:
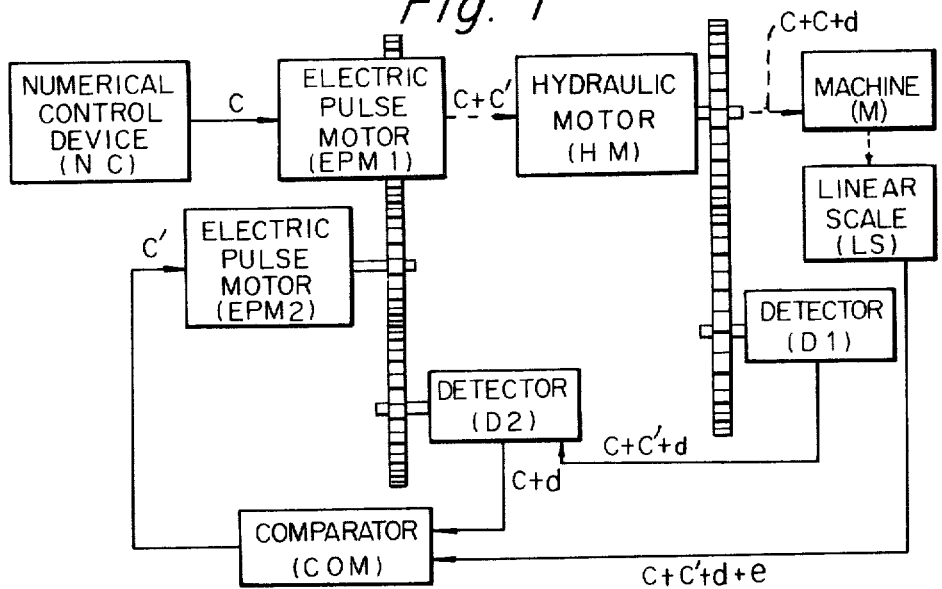

Referring to FIG. 1 showing a numerical control system provided with an already proposed error-compensating apparatus, command pulses from the numerical control apparatus NC are supplied to the electric pulse motor EPM1 and rotates the output axis of the motor. The output axis of the electric pulse motor EPM1 is connected to the hydraulic motor HM, so that the output torque of the electric pulse motor EPM1 is amplified, that is, the electric pulse motor EPM1 and the hydraulic motor HM compose a known electrohydraulic pulse motor. The machine M is moved by the amplified output of the hydraulic motor HM by way of the feed mechanism. The scope of the art explained up till now, is coincidental with the known art of an open-loop numerical control system. For the elements of the error-compensating apparatus, there are provided, with a linear scale LS which detects the actual moving quantity of the machine, a detector D1 which detects the quantity of the rotation of the output axis of the hydraulic motor, a compensating electric pulse motor EPM2, a detector D2 which detects the difference between the quantity of the rotation of the motor EPM2 and of the hydraulic motor HM, and a comparator COM which compares the detected quantity of the detector D2 with that of the above-mentioned linear scale.

By applying the above elements, the compensating performance is carried out in a manner described below.

The positive or negative compensating pulses are generated depending upon whether the above compared result is plus or minus, then the above-mentioned compensating pulse motor EPM2 is brought into rotation by the command pulses. The rotation of the motor EPM2 rotates the housing of the electric pulse motor EPM1, which forms a portion of the electrohydraulic pulse motor, by way of a gearing mechanism. Consequently, the output axis of the motor EPM1 rotates correspondingly to the quantity to be compensated to make required compensation of an error.

Now, assuming that $c$, $c'$, $d$ and $e$ are the command quantity, the compensated quantity, the response delay of the electro-hydraulic pulse motor, and the error of the feed mechanism of the machine or the like, the corresponding signals transmitted are shown in FIG. 1 and the compensating pulses are emitted so as to effect that $c'$ and $e$ equals zero. But in the above-known system, since resolvers are used for detectors D1 and D2 and since the detector D1 detects the output of the hydraulic motor, the indexing errors of the detectors D1, D2 and hydraulic motor (or the electro-hydraulic pulse motor) affect the accuracy of the whole of the system.

Figure 2:
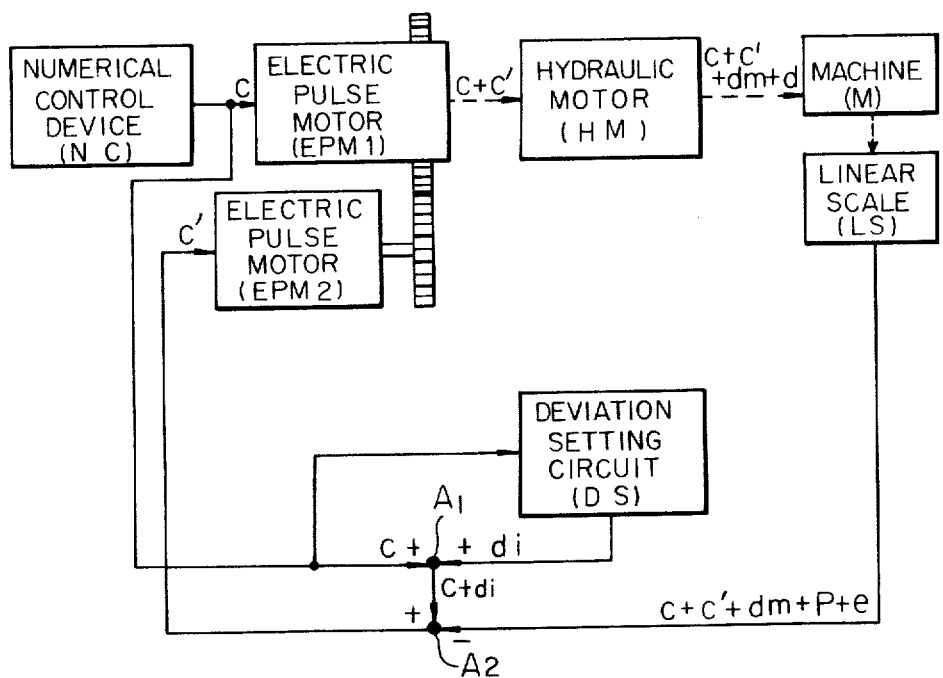

FIG. 2, which is a block diagram of a numerical control system in accordance with the present invention, indicates that the compensation of an error is carried out by rotating the housing of electric pulse motor EPM1 with the compensating electric pulse motor EPM2, the same as in the above description. But the detection of the driving quantity for the machine is carried out by making use of the command pulses directly from the numerical control apparatus.

In FIG. 2, the signals $c$, $di$, $dm$, $p$ and $e$ indicate the command pulses, the ideal steady-state deviation of the whole system, the steady-state deviation of electro-hydraulic pulse motor, the indexing error of electro-hydraulic pulse motor, and the errors of the mechanical systems (a pitch error, backlashes, elastic deformation and the like).

In accordance with the present invention, the deviation proportional to the frequency of command pulses is produced and summed up with the command pulses C at the summing point A1 and afterward, the resultant $c + di$ are subtracted by the actual moving quantity ($c + c' + dm + p + e$) at the summing point A2. Then, the positive or negative compensating pulses are obtained depending upon whether the resultant total is positive or negative, that is, the compensating pulses $c'$ are supplied so that the total, $di - (c' + dm + p + e)$, becomes always zero.

This can accomplish a high accurate continuous path control, if di is set to vary linearly in relation to the command velocity so that the steady-state deviation is controlled to always maintain an ideal setting value di in the whole control system incuding a mechanical system. Still, anyone of a linear inductosyn, a magnescale or a Moire fringe device can be applicable for the linear scale. Each of the former ones detects mechanical deviation as electrical phase shift, while the latter detects it as pulse signals. So, when the pulses should be applied at the summing point A2, the electrical phase shift signals are transformed into the rows of pulses, the number of which being proportional to the phase shift in accordance with the known A-D converting method at the point A2.

Figure 3:
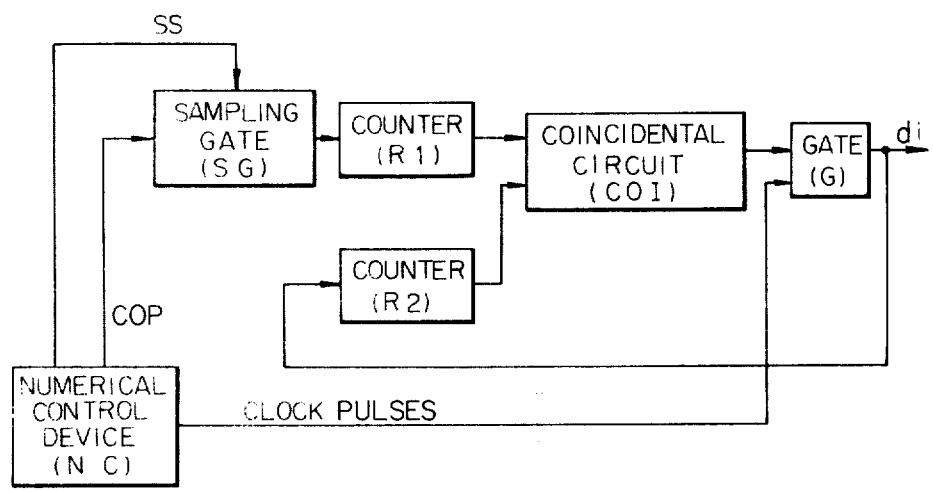

FIG. 3 shows an embodiment of a deviation setting circuit which sets deviation di in proportion to the command velocity, that is, the frequency of the command pulses.

This circuit comprises two counters R1 and R2, a sampling gate SG, a coincidental circuit COI and a gate G. A sampling signal ss opens the sampling gate SG for predetermined period T1 and makes the counter R1 count the command pulses COP. After the completion of the above counting by the counter R1, the clock pulses from the numerical control apparatus are emitted to produce the deviation pulses di through the gate G, until the content of the counter R2 is equalized to the content of the counter R1. As soon as the contents of the counter R1 and R2 are equalized, the gate G closes in company with resetting the counters in accordance with the signal from the coincidental circuit COI and the performances similar to the above description are repeated again. Thus, the number of output pulses through the gate G is made to be accurately proportional to the velocity of the command pulses and the quantity of the deviation di is changeable at will by varying the counting period T1 of the counter R1.

Figure 4:
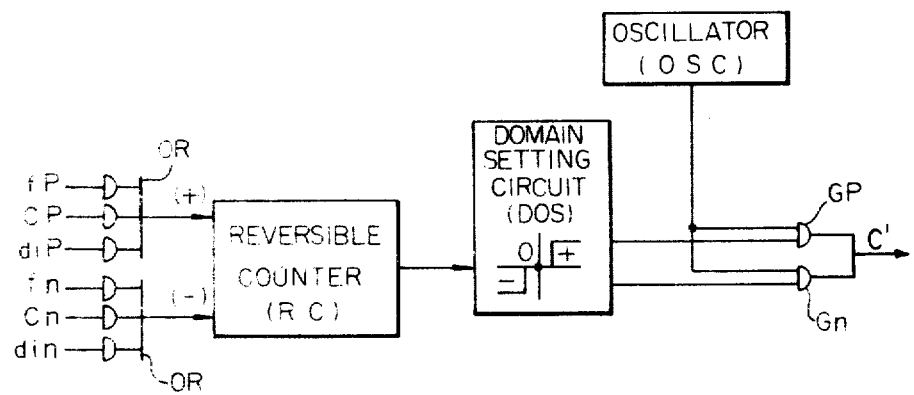

FIG. 4 is a detailed block diagram of the compensating pulse generating portion. In the drawing, fp, cp and dip show the feedback positive pulses in accordance with the detection by the linear scale, the command positive pulses and the deviation positive pulses, respectively. On the other hand, fn, cn and din show the feedback negative pulses, the command negative pulse and the deviation negative pulses, respectively.

When the machine is moved toward the positive direction, the command positive pulse Cp are given and added to the reversible counter RC. At the same time, deviations are also given to the reversible counter RC, but as the subtracting input in the negative pulses di, and the feedback pulses are given as the subtracting input in the negative pulses. Consequently, in the reversible counter RC, the value corresponding to the above-mentioned $di - (c' + dm + p + e)$ is stored.

Then, the content of the counter RC is discriminated by passing through the domain setting circuit DOS as to whether it is a positive, zero or negative value. If it is positive or negative, one of the gates Gp and Gn is opened, respectively, and both gates are closed if it is zero.

When one of the gates Gp and Gn is opened, the pulses emitted from the oscillator OSC are obtained as the compensating pulses.

In the above-described embodiment, as soon as the command pulses come to an end, the deviation di becomes zero accurately, consequently, the signals of the linear scale arrive to be compared directly with the total of command signals given by the numerical control device and therefore, the final positioning accuracy of the whole system depends upon the single accuracy of the linear scale.

Figure 5:
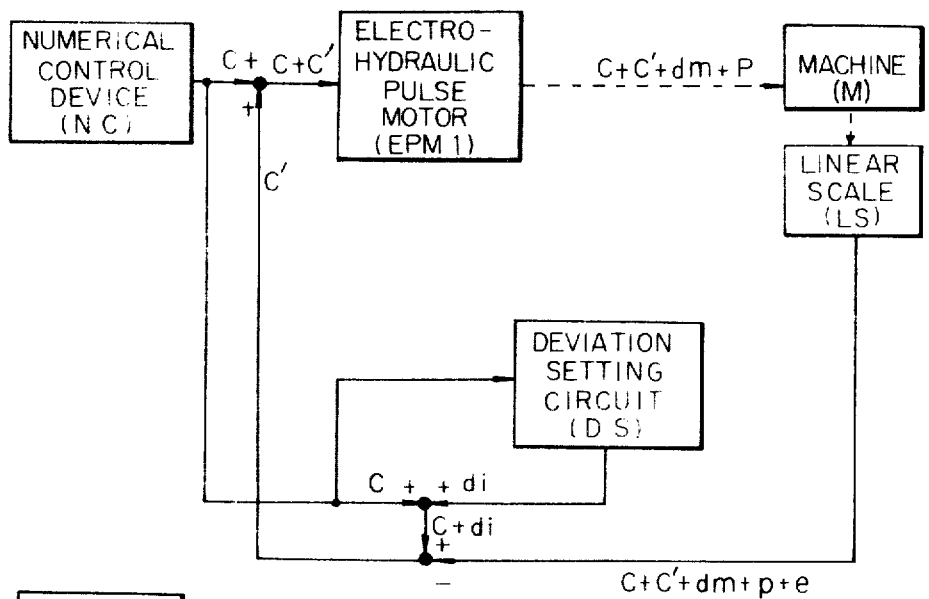

In the above-mentioned embodiment, the compensation of an error is performed by driving the compensating electric pulse motor EPM2 by the compensating pulse c', but when the compensation of an error smaller than the unit of a set value is unnecessary, the electric pulse motor EPM1 may be rotated by the command pulses being combined directly with the compensating pulses c'. This embodiment is shown in FIG. 5.

Figure 6:
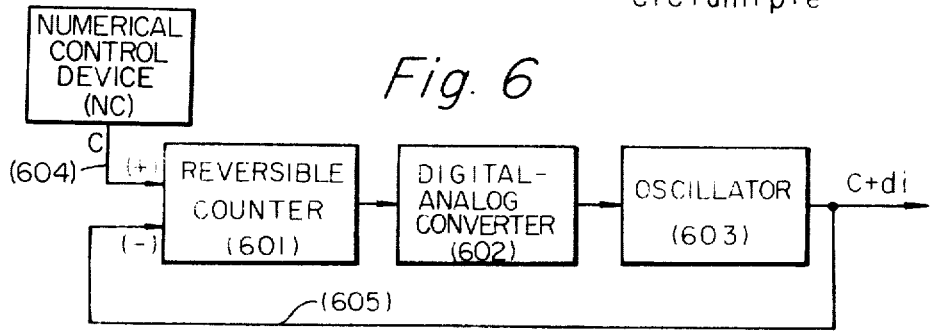

FIG. 6 shows another embodiment of a deviation setting circuit in FIG. 2.

By making use of the deviation setting circuit shown in FIG. 6 and by giving the command pulses C for the input to the circuit, the output c + di can be obtained through the circuit.

This circuit comprises a reversible counter 601, a digital-analog converter 602 which produces voltage (analog) outputs proportional to the content of counter 601, and an oscillator 603 which emits pulses having the frequency proportional to the output of the digital-analog converter 602. The command pulses C are given to the summing input terminal of the reversible counter 601 by way of the line 604, and the output pulses of the oscillator 603 are given to the subtracting input terminal of the reversible counter 601 by way of the line 605.

In this circuit, if the frequency of the command pulses C is low, the content (the quantity of the added pulses) of the counter 601 is small and if the frequency is high, the content becomes large.

As an output of the oscillator 603, $c + di$ can be obtained in conclusion.

Figure 7:
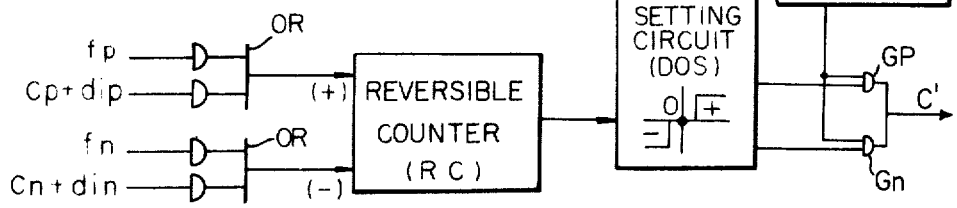

Thus, the output $c + di$ for the input C can be obtained by applying the circuit shown in FIG. 6, and accordingly the inputs cp and dip, or cn and din in FIG. 4 form the combined input, respectively. Consequently, the circuit of FIG. 4 is more improved to that of FIG. 7.

As explained above, in accordance with the present invention, a high accurate compensation of an error in numerical control can be accomplished and more over, a high accurate continuous path control can be accomplished as the deviations of the mechanical systems including the servo system is kept equal to the ideal deviations of the whole of the numerical control system.

What we claim is:

1. In a numerical control system including pulse motor means for driving a movable element of a machine, means for generating pulses in proportion to the actual velocity of said movable element, and means for supplying command velocity input pulses, an improvement for compensating for an error in said numerical control system comprising, means for applying input signals to said pulse motor means to drive said pulse motor means to control a velocity of movement of said movable element, deviation signal generating means having an input for application of said command velocity input pulses and having an output for producing deviation signal pulses in proportion to a command velocity determined by said command input pulses, means for combining said command input pulses, said deviation signal pulses, and said actual velocity pulses to produce compensating pulses, means for applying said compensating pulses and said command velocity input pulses to said means for applying input signals to said pulse motor means, said means for applying input signals to said pulse motor means including means for applying said command velocity input pulses as an electrical input to said pulse motor means, and pulse responsive means connected to said pulse motor means for supplying a mechanical input thereto in response to said compensating pulses for altering the velocity of said pulse motor means as determined by said command velocity input pulses.

2. In a numerical control system composed of a numerical control device giving command pulses, an electro-hydraulic pulse motor capable of generating output torques to move a machine in response to said command pulses, a detecting means for detecting an actual movement quantity of a movable part of a machine, and a compensating pulse generating means for generating compensating pulses in response to which said electro-hydraulic pulse motor generates output torques for compensating the error of movement of said part of the machine, an apparatus for compensating an error in the numerical control system comprising, a deviation setting means for issuing pulses representing a steady-state deviation proportional to the frequency of said command pulses, and a compensating pulse generating means for generating said compensating pulses so that the resultant of an addition of said steady-state deviation pulses, said command pulses, and feedback pulses corresponding to said actual movement quantity of said part and detected by said detecting means, is made zero, whereby the error of the numerical control system maintains a proportional relationship to the velocity of said command.

* * * * *